United States Patent [19]

Walters

[11] Patent Number: 4,834,761
[45] Date of Patent: May 30, 1989

[54] ROBOTIC MULTIPLE-JOINTED DIGIT CONTROL SYSTEM

[76] Inventor: David A. Walters, P.O. Box 26776, Kansas City, Mo. 64196

[21] Appl. No.: 2,752

[22] Filed: Jan. 12, 1987

Related U.S. Application Data

[63] Continuation-in-part of Ser. No. 732,067, May 9, 1985, abandoned.

[51] Int. Cl.⁴ .............................................. B25J 15/10
[52] U.S. Cl. ...................................... 623/26; 294/88; 294/111; 254/228; 623/64; 92/76; 92/137; 901/37; 414/4; 414/7
[58] Field of Search .................... 414/730, 744 A, 751, 414/1, 4, 7; 901/39, 31, 36, 37; 294/88, 115, 111; 623/63, 64, 57, 26; 92/137, 146, 76, 51–53; 254/264, 386, 390, 392, 393, 396, 397, 228

[56] References Cited

U.S. PATENT DOCUMENTS

| | | | |
|---|---|---|---|
| 2,663,285 | 12/1953 | Johnston et al. | 92/53 X |
| 2,696,010 | 12/1954 | Robinson | 623/64 X |
| 3,658,189 | 4/1972 | Brown et al. | 92/52 X |
| 3,694,021 | 9/1972 | Mullen | 414/4 X |
| 3,717,071 | 2/1973 | Gordon | 92/137 |
| 3,920,084 | 11/1975 | Russell, Jr. | 92/52 X |
| 4,121,840 | 10/1978 | Berg | 92/137 X |
| 4,246,661 | 1/1981 | Pinson | 901/36 X |
| 4,498,370 | 2/1985 | Breeden et al. | 92/137 X |
| 4,643,399 | 2/1987 | Fletcher | 254/392 X |
| 4,694,733 | 9/1987 | Green | 92/137 X |
| 4,712,772 | 12/1987 | Negrutsky et al. | 254/264 |
| 4,726,281 | 2/1988 | De Filippi | 92/52 X |

FOREIGN PATENT DOCUMENTS

| | | | |
|---|---|---|---|
| 2940916 | 4/1981 | Fed. Rep. of Germany | 294/88 |
| 488696 | 2/1976 | U.S.S.R. | 901/39 |
| 743678 | 6/1980 | U.S.S.R. | 901/39 |

Primary Examiner—Robert J. Spar
Assistant Examiner—William M. Hienz

[57] ABSTRACT

This disclosure describes a mechanical hand constructed to simulate the range of motion of a human band. The mechanical hand provides a remote manipulator device capable of reproducing all of the motions of the human wrist, hand, fingers, and thumb in a compact in-line package. The configuration of the hand allows the motion of each finger or digit to be independent of the motion the wrist and of the motion of each other digit. Also the motion of each joint of each digit is independent of the motion of each other joint on the same digit and other joints of other digits. Also, the hand allows the amount of pressure applied to an object by the digits and the resistance to motion of the joints in the hand by an external applied force on the hand to vary under the control of features inherent in the hand's construction. Further, a method for the organization of actuators for the hand, that may be fluid-activated cylinders, is described. These actuators pull cables or tendons attached to joints, rotating the joints. Actuators pull not only the joint to which they are attached, but also other actuators attached to other joints on the same digit.

7 Claims, 15 Drawing Sheets

ROBOTIC MULTIPLE-JOINTED DIGIT CONTROL SYSTEM

This application is a continuation-in-part of application Ser. No. 06/732067, filed on May 9, 1985, now abandoned.

BRIEF SUMMARY OF INVENTION

This is a method for controlling the motion of jointed digits in a robotic device. This is done by allowing fluid-actuated pistons to shorten or lengthen an attached cable that runs to the joint being moved, pulling that joint back and rotating the joint. One piston is attached to each joint for each direction of motion (up-down, back-forth), and all pistons supplying motion to one direction of motion of one many-jointed unit or digit are interconnected to allow all cables to remain under equal pressure. This is accomplished by allowing the piston controlling one joint to move not only that joint, but also the pistons controlling the motion of the joints farther from that joint on the digit.

In controlling the motion of a simple hinge joints, two cylinders are connected to tendons attached to that joint, one to pull the joint inward, or flex the joint, and one to restore the original position of the joint, or extend the joint. When pressure is increased in one cylinder to effect motion in a joint, the pressure in the corresponding cylinder for that joint must be reduced to allow the motion to take place. Increasing the pressure on both cylinders equally effectively locks the joint in place, and reduction of the pressure in both cylinders effectively frees the joint to swing freely. This type of control of motion using two cylinders with tendons to move a joint can be described as using a cylinder couple to effect the up-down or flexion-extension motion of that joint.

To control the motion of a ball-and-socket joint, or a joint that has two directions of motion, two cylinder couples can be used, one set to control up-down motion, and one set to control back-forth motion. In the case of side-ways motion, or motion on a diagonal to the orientation of the two cylinder couples, the motion is accomplished with a combination of motion of both sets of cylinder couples acting concurrently.

To overcome friction of operation of pistons in cylinder, double-acting cylinders can be used, so that when a cylinder needs to release the tension on a cable to allow the joint attached to it to move back, that cylinder can be activated to move in the reverse direction under pressure from a second inlet in the cylinder. The friction inside the cylinder is then not allowed to slow the reverse motion of the joint. Also, friction encountered by the cable connecting the joint to the cylinder caused by the tension in the cable is eliminated with the double acting cylinder.

DETAILED DESCRIPTION OF THE DRAWINGS

Figures 1, 2, 3:
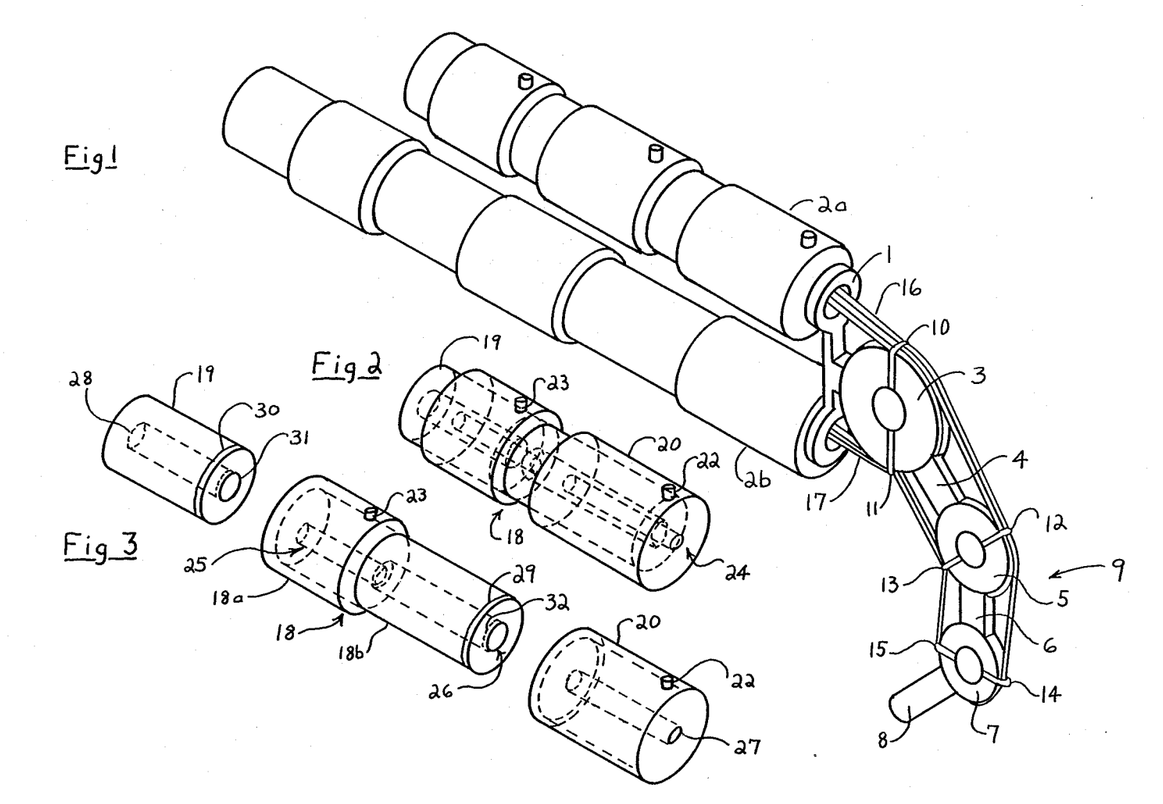
FIG. 1 is a view of one drive unit of a multi-jointed digit.
FIG. 2 is a view of one cylinder-piston unit from the drive unit in FIG. 1.
FIG. 3 is an exploded view of a cylinder-piston unit from FIG. 2.

Referring to the drawings, in FIG. 1 a bracket 1 connecting cylinder units 2a and 2b and a pivoting finger joint 3 is shown. This joint 3 is connected and fixed to member 4. Member 4 in turn connects to the second pivoting finger joint 5. This finger joint 5 is connected and fixed to the connecting member 6 which connects to the third pivoting finger joint 7. This joint 7 is then connected and fixed to the extension member 8, forming the last jointed member of the finger-digit 9.

Loops 10, 11, 12, 13, 14, and 15 are present next to the joints 3, 5, and 7 to hold the tendons bundles 16 and 17 in close contact to the joints 3, 5, and 7. The loops 10, 11, 12, 13, 14, and 15 do not rotate with the joints 3, 5, and 7, but remain fixed to the bracket 1 and the connecting members 4 and 6.

Referring to FIG. 2, a piston-cylinder hybrid drive unit 18 from FIG. 1 is shown. Fitted into the cylinder end of the unit is a piston 19 and fitted on the piston end of the unit is a cylinder 20. Air or fluid inlets 22 and 23 are attached to the cylinders 18 and 20. A hole 24 for cables runs through the middle to allow cables to run through.

Referring to FIG. 3 the same piston-cylinder hybrid drive from FIG. 2 is shown, only exploded, to diagram the internal configuration. The piston-cylinder hybrid 18 has a small tube 25 through the center of the cylinder-section 18a and a larger tube 26 through the center of the piston-section 18b. The end cylinder 20 has a tube 27 through its center that fits tightly inside the tube 26 of the hybrid piston 18b. The end piston 19 has a tube 28 that fits tightly around the tube 25 in the center of hybrid cylinder 18a. The tubes 26 and 27 and the tubes 25 and 28 seal tightly to provide pressure to allow the movement of the pistons 19 and 17b in the cylinders 20 and 18a when pressure enters or leaves the inlets 22 and 23. Seals at the location of 31 and 32 between the tubes 25 and 28 and the tubes 26 and 27 and larger seals around the pistons 19 and 17b at locations 29 and 30 help provide containment of pressure.

Figure 4A:
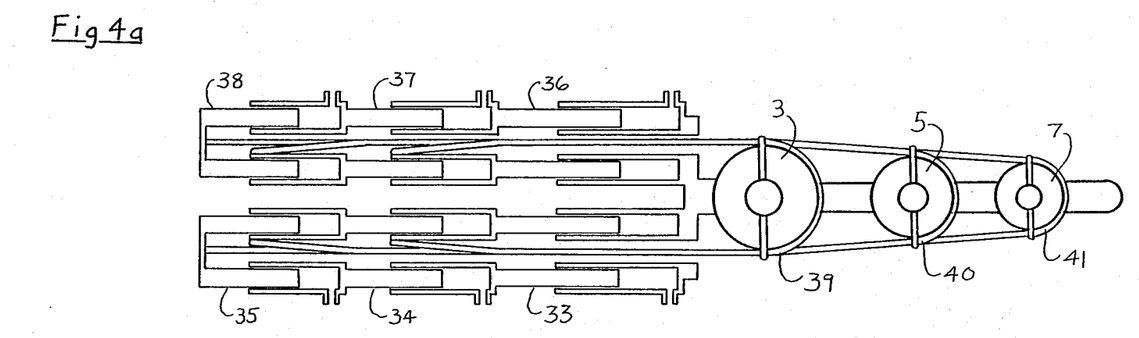
FIG. 4 includes four schematic views in cross-section of the drive unit in FIG. 1 showing relative positions of the pistons and corresponding movement of joints.

In FIG. 4, the relative positions of th pistons labeled in FIG. 4a; pistons 33, 34, 35, 36, 37, and 38 are shown with respect to the position of rotation of the joints 3, 5, and 7.

In FIG. 4a the joints, 3, 5, and 7 are all straight, and all pistons are at the center of their displacements.

Figure 4B:
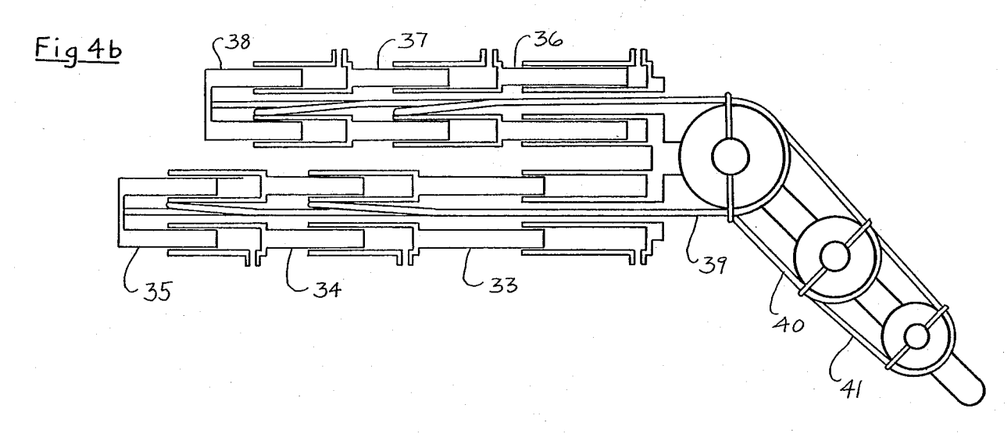

In FIG. 4b joint 3 moved and joint 5 and joint 7 are straight.

Figures 4C, 4D:
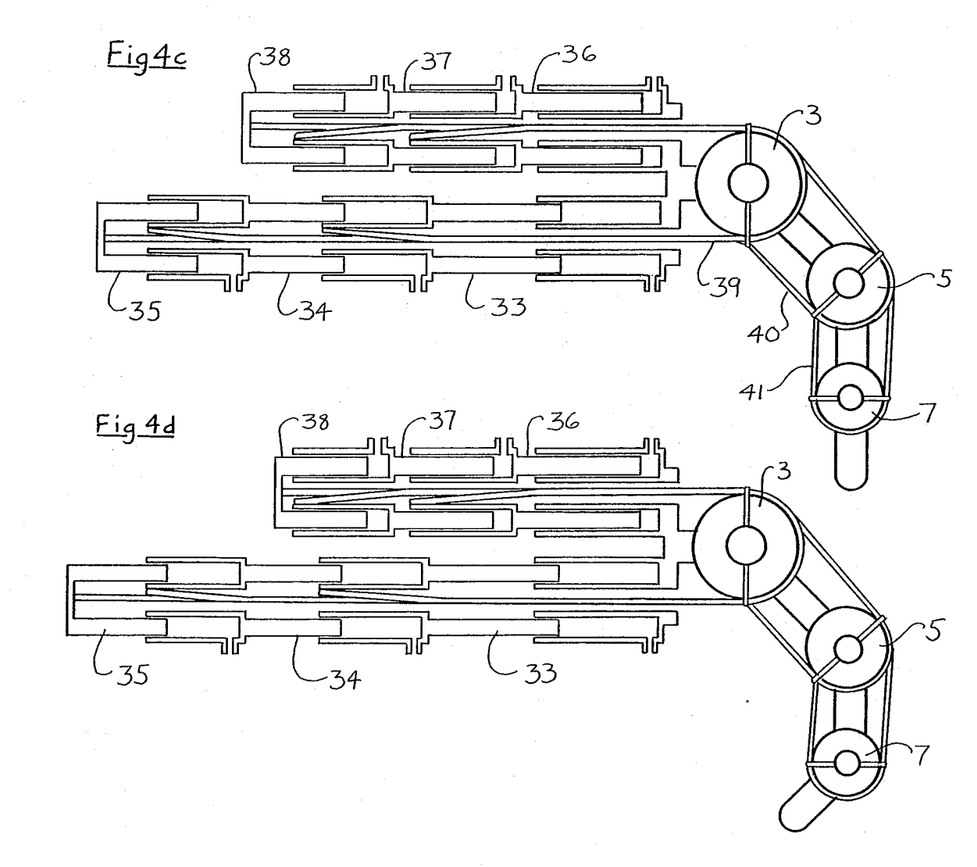

In FIG. 4c only joints 3 and 5 have been moved, and joint 7 is straight. Pistons 38 and 35 remain with a displacement midpoint within their cylinders.

In FIG. 4d, the piston 35 moved back, and piston 38 moved forward the same amount that piston 35 moved back. The tendon 39 that runs around the joint 3 caused the joint 3 to move when piston 36 and piston 33 moved, because the tendon 39 is attached to piston 33 and piston 36. Joint 5, connected to pistons 37 and 34 with the tendon 40 has moved likewise, as has joint 7, which is connected to piston 38 and piston 35.

Figures 5, 6, 7:
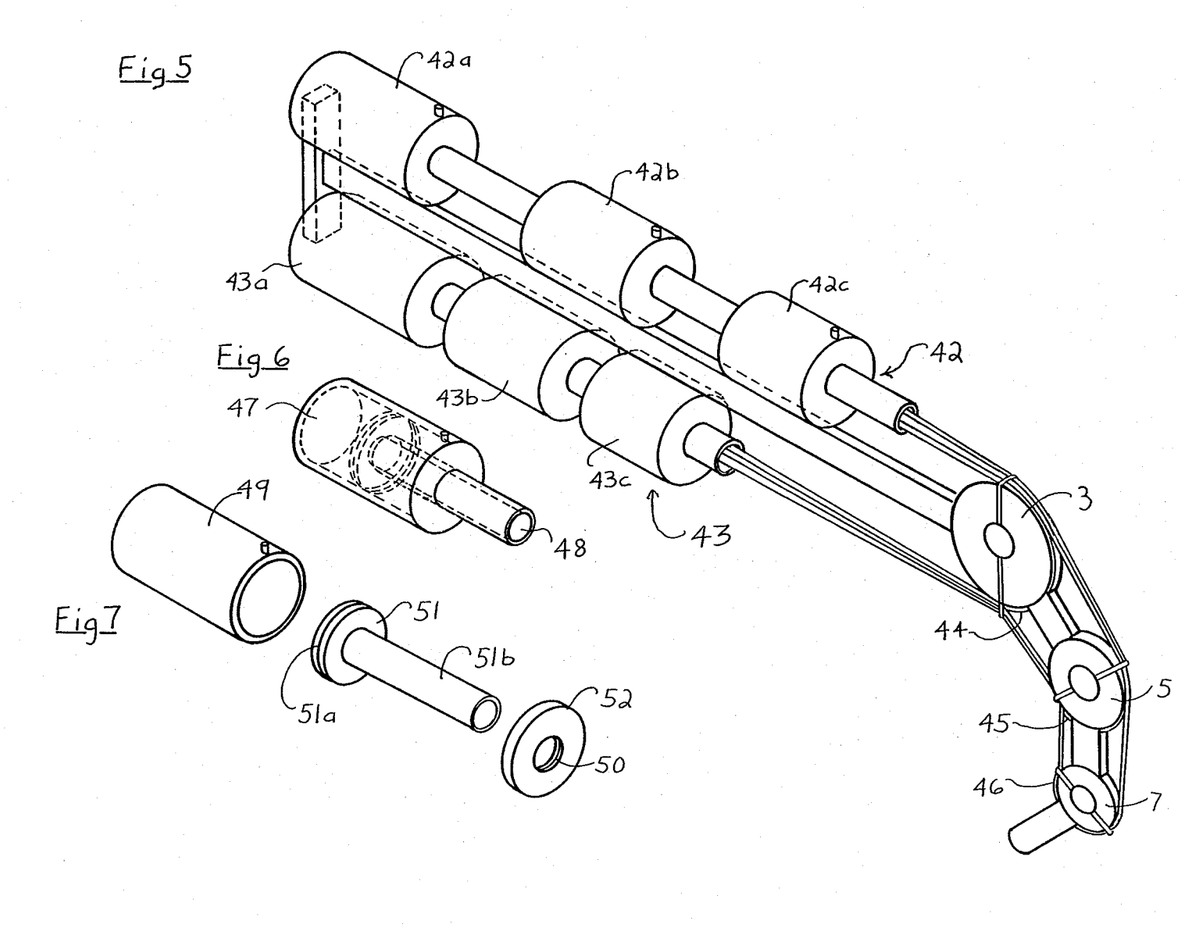
FIG. 5 is a second type of drive system of a multi-jointed digit.
FIG. 6 is a view of one cylinder of the drive unit in FIG. 5.
FIG. 7 is an exploded view of a cylinder from FIG. 6.

FIG. 5 shows a view of a second type of drive system for one multiple jointed member of a robotic hand. The cylinder groups 42 and 43 replace the cylinder groups 2a and 2b from FIG. 1. The cylinder "couple" 42a and 43a are attached to tendon 44. This tendon loops around the joint 3, so the joint 3 is moved when the displacement of the cylinders 42a and 43a change. Likewise cylinders 42b and 43b control joint 5 with tendon 45 and cylinders 42c and 43c control joint 7 with tendon 46.

FIG. 6 shows one cylinder 47 from the group of cylinders in FIG. 5. A hole 48 runs through the center to allow the cables or tendons to go through.

FIG. 7 is an exploded view of the cylinder in FIG. 6 showing the cylinder 49, the piston 51 with the seal on the surface edge 51a and the tube 51b that fits tightly to the seal 50. A cap 52 allows assembly to fit together.

Figure 8A:
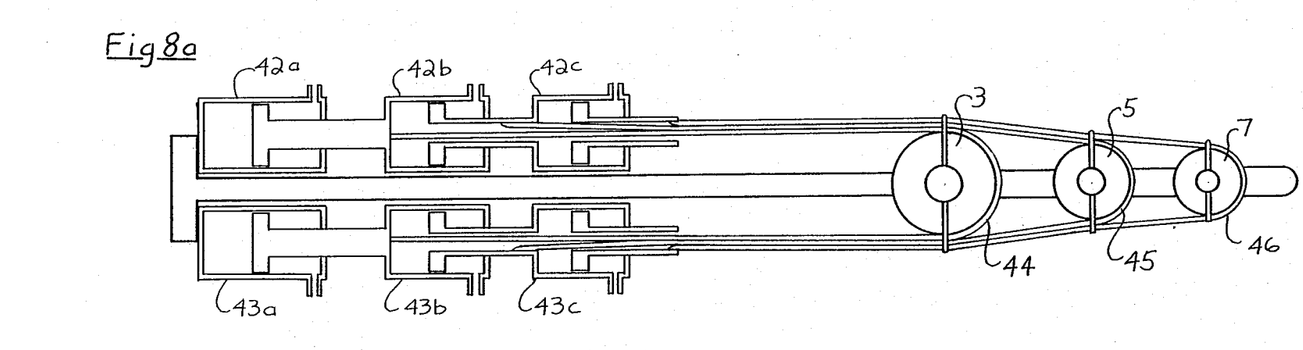
FIG. 8 includes four schematic views in cross-section of the drive unit in FIG. 5 showing relative positions of pistons and corresponding movement of joints.
Figure 8B:
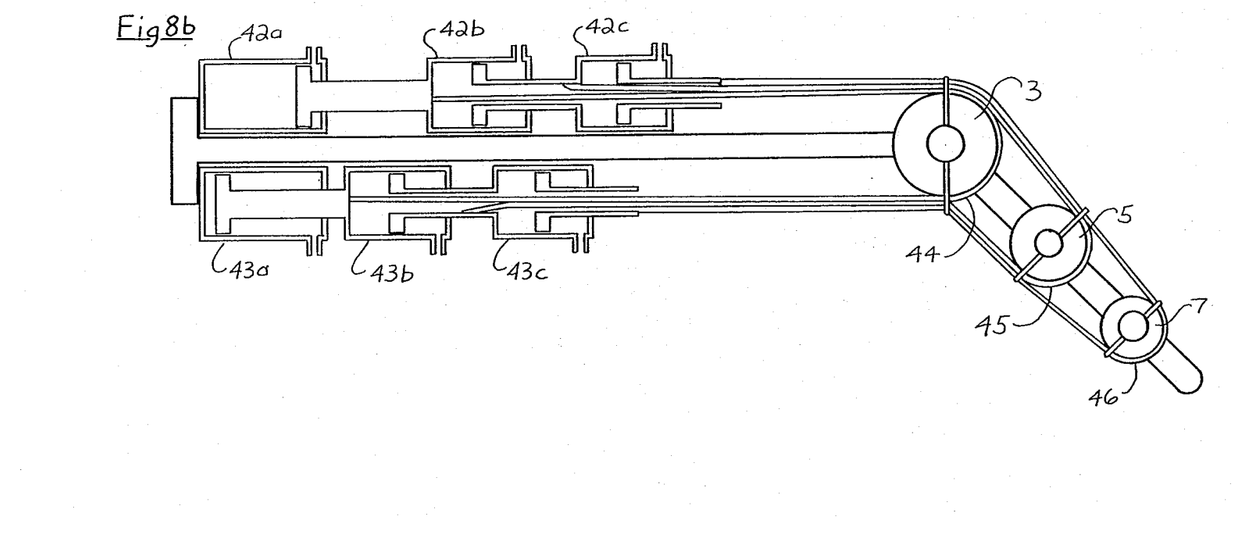
Figures 8C, 8D:
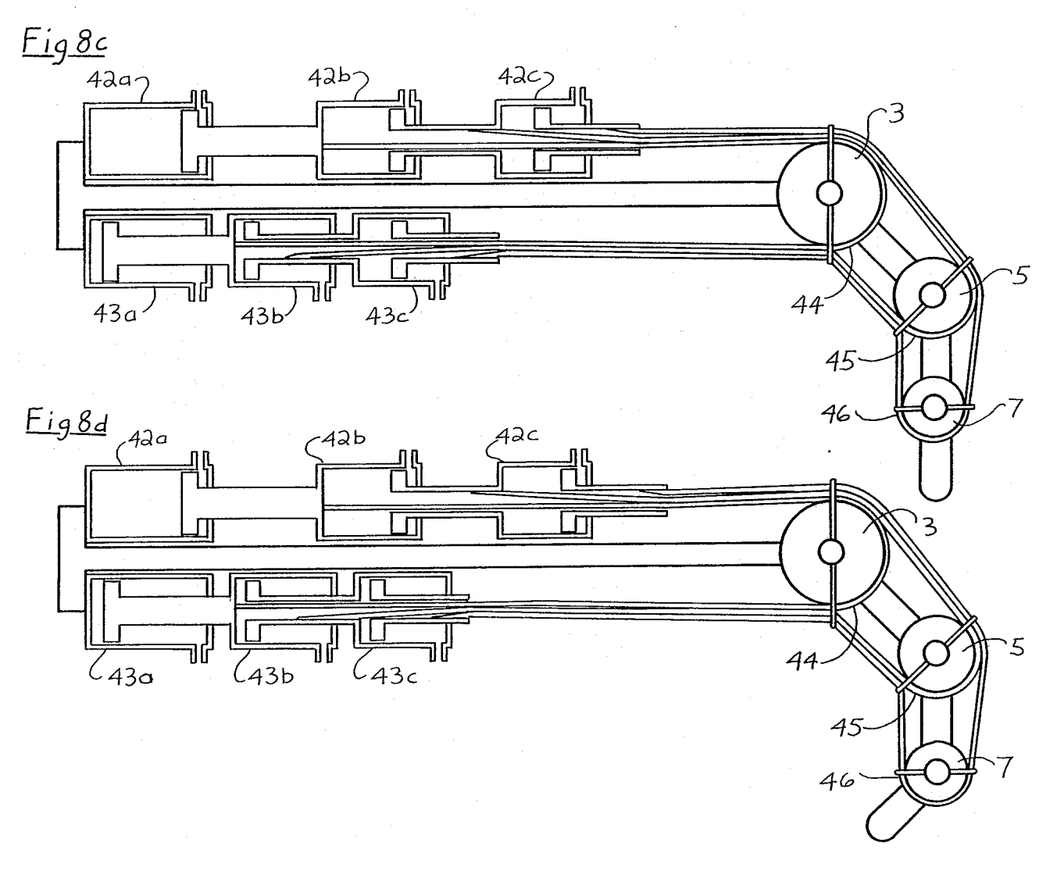

FIG. 8, a through c, shows schematic diagrams in cross-section of the relative positions of the joints and the movement of the pistons and cylinders from FIG. 5. It can be seen that the cylinders 42a and 43a control joint 3, the cylinders 42b and 43b control joint 5, and the cylinders 42c and 43c control the movement of joint 7.

Figures 9, 10, 11:
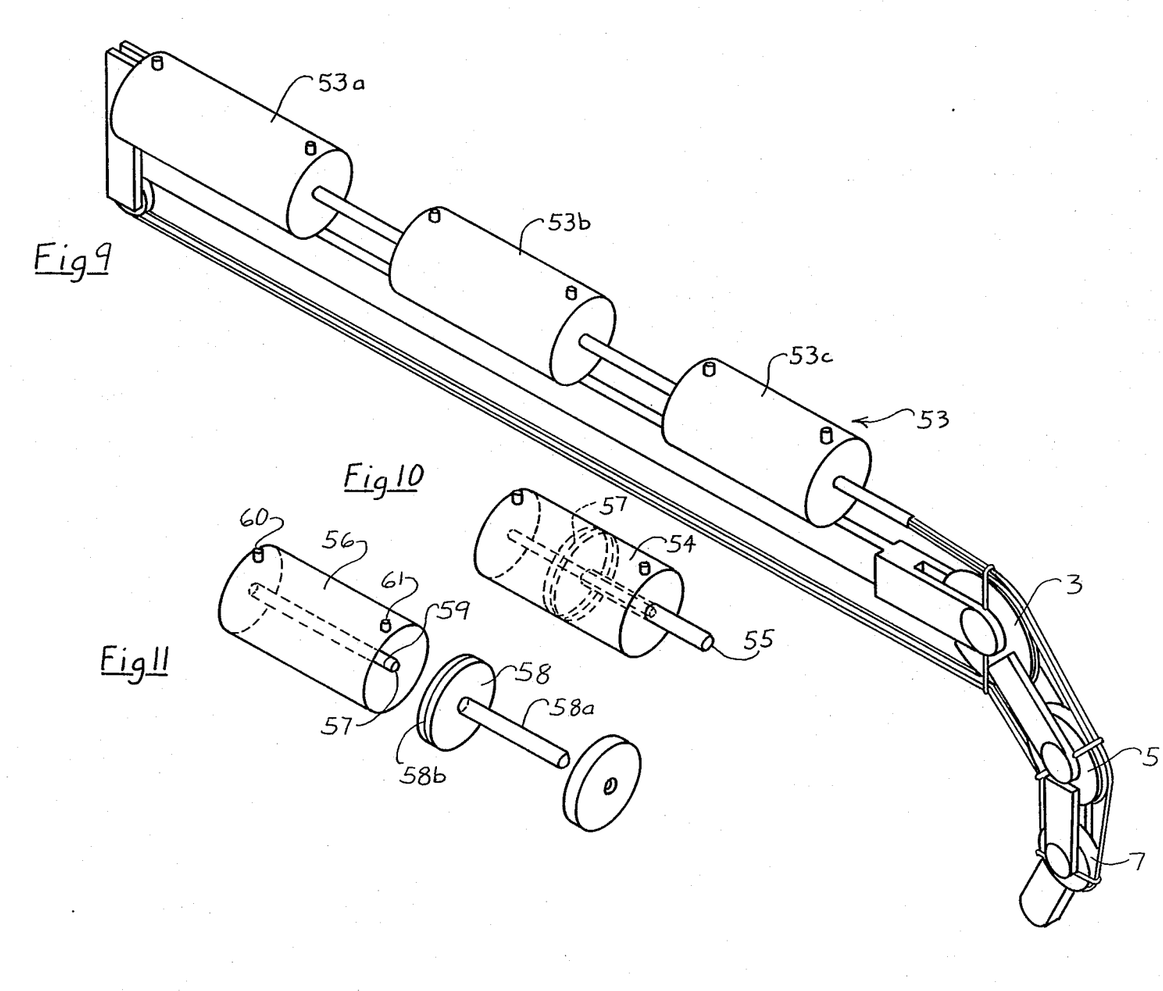
FIG. 9 is a third type of drive unit of a multi-jointed digit.
FIG. 10 is a view of a cylinder of the drive unit from FIG. 9.
FIG. 11 is an exploded view of the cylinder from FIG. 10.

FIG. 9 shows a third arrangement for a drive system of a single multiple jointed digit of a robotic hand, using a unit of three cylinders, 53. This unit is comprised of cylinders 53a, 53b, and 53c. The motion of cylinder 53a controls the movement of joint 3, the motion of cylinder 53b controls the motion of joint 5, and the motion of cylinder 53c controls the motion of joint 7.

FIG. 10 shows a single cylinder 54 from the cylinder assembly in FIG. 9. A hole 55 in the center allows the cables or tendons to run through.

FIG. 11 shows an exploded view of the cylinder assembly in FIG. 10. The cylinder 56 has a small tube 59 at its center that fits into the larger tube 58a belonging to the piston 58. The seal shown at 57b seals against the surfaces at 57 to help keep the pressure from leaking. Fluid inlets at 60 and 61 allow for double-acting motion of the cylinder. This is then translated into two-directional motion of a joint with one double-action cylinder instead of two single-acting cylinders functioning as a couple as in the arrangement in FIG. 1 and FIG. 4.

Figure 12A:
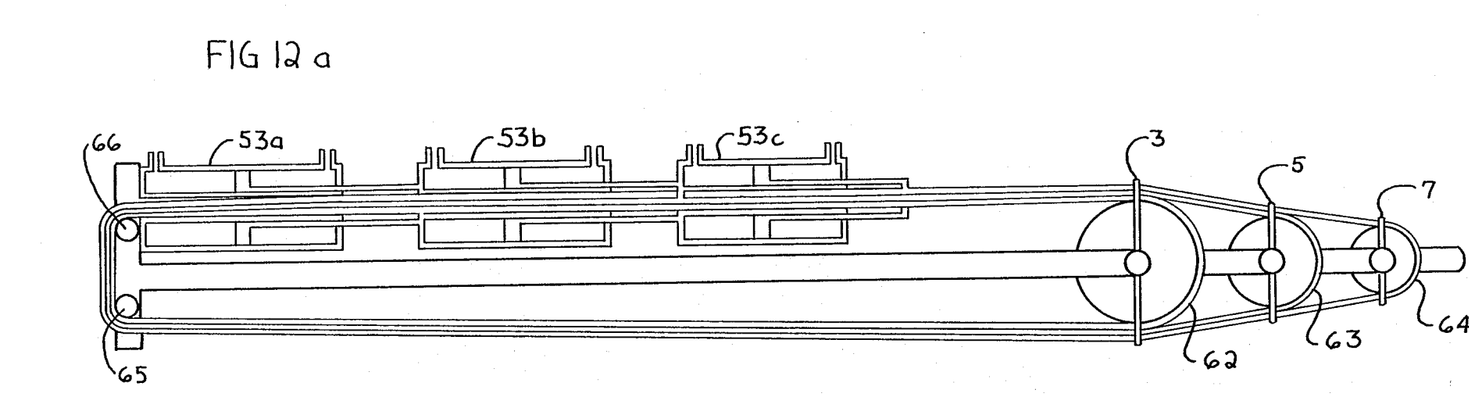
FIG. 12 includes four views in cross-section of the drive unit in FIG. 9 showing relative positions of pistons and corresponding movement of joints.
Figure 12B:
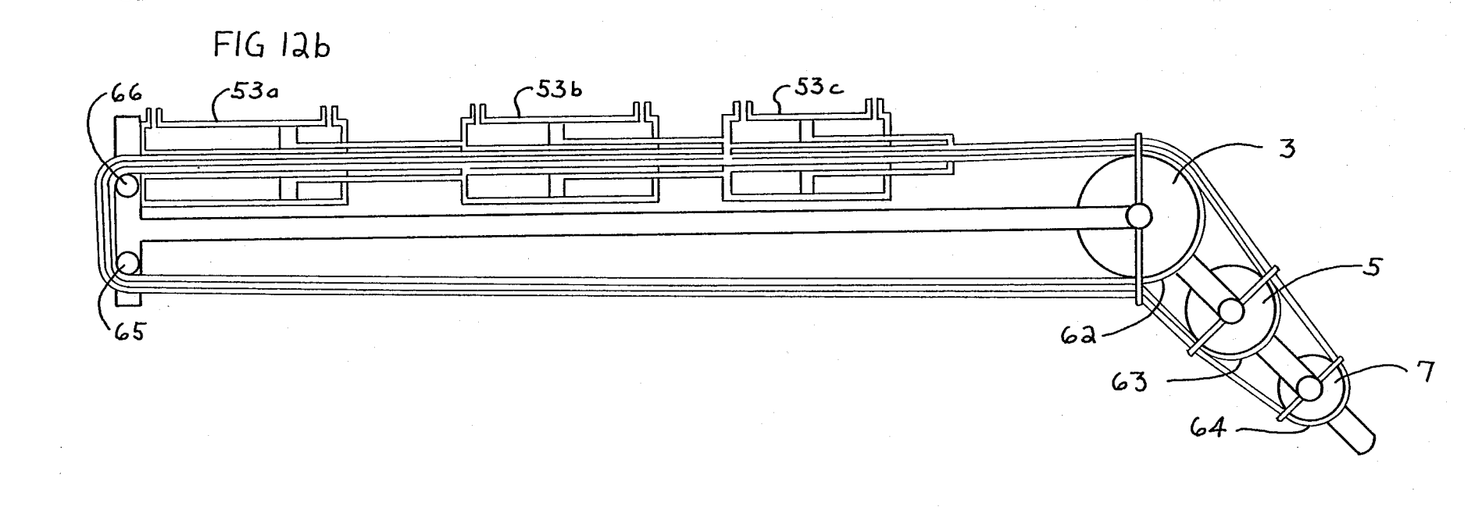
Figures 12C, 12D:
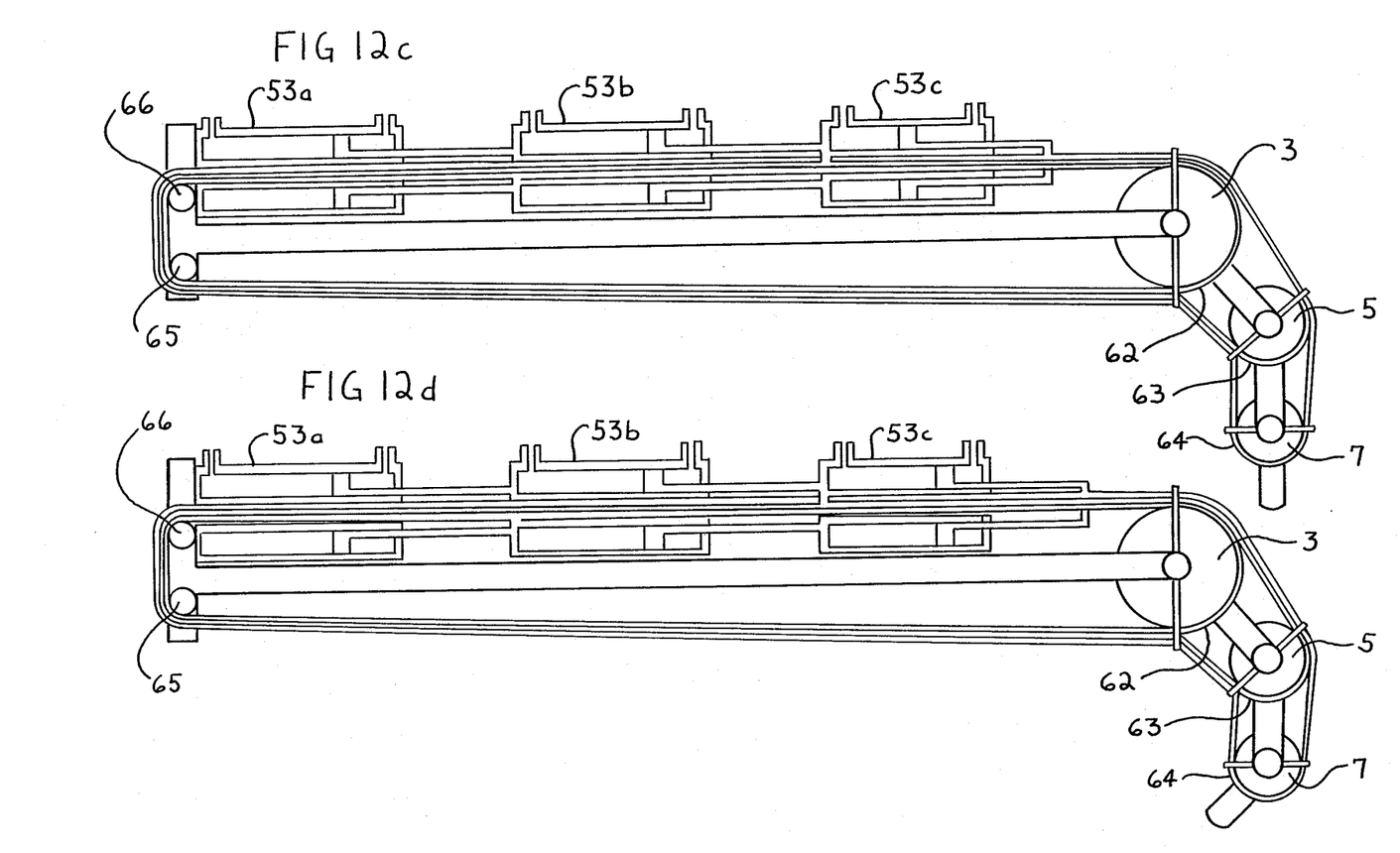

FIG. 12, a through c, shows the positions of the joints 3, 5, and 7 relative to the positions of the cylinders 53a, 53b, and 53c. In FIG. 12a all the joints 3, 5, and 7 are straight and all the cylinders 53a, 53b, and 53c are at the center of their displacements. In FIG. 12b the joints 5 and 7 are straight and the cylinders 53c and 53b are in the center of their displacements. The joint 3 has moved and the piston of cylinder 53a has moved. In FIG. 12c only the joint 7 is straight and the cylinder 53c is in the center of its displacement. In FIG. 12d the three joints 3, 5, and 7 have all moved downward and the three cylinders 53a, 53b, and 53c have all moved forward. The cables 62, 63, and 64 attach to the pistons of the cylinders 53a, 53b, and 53c, respectfully, traveling from the pistons, around the joints, back to the rear of the arm, around the pulleys 65 and 66, and back to the pistons.

Figures 13, 15, 16, 21, 22:
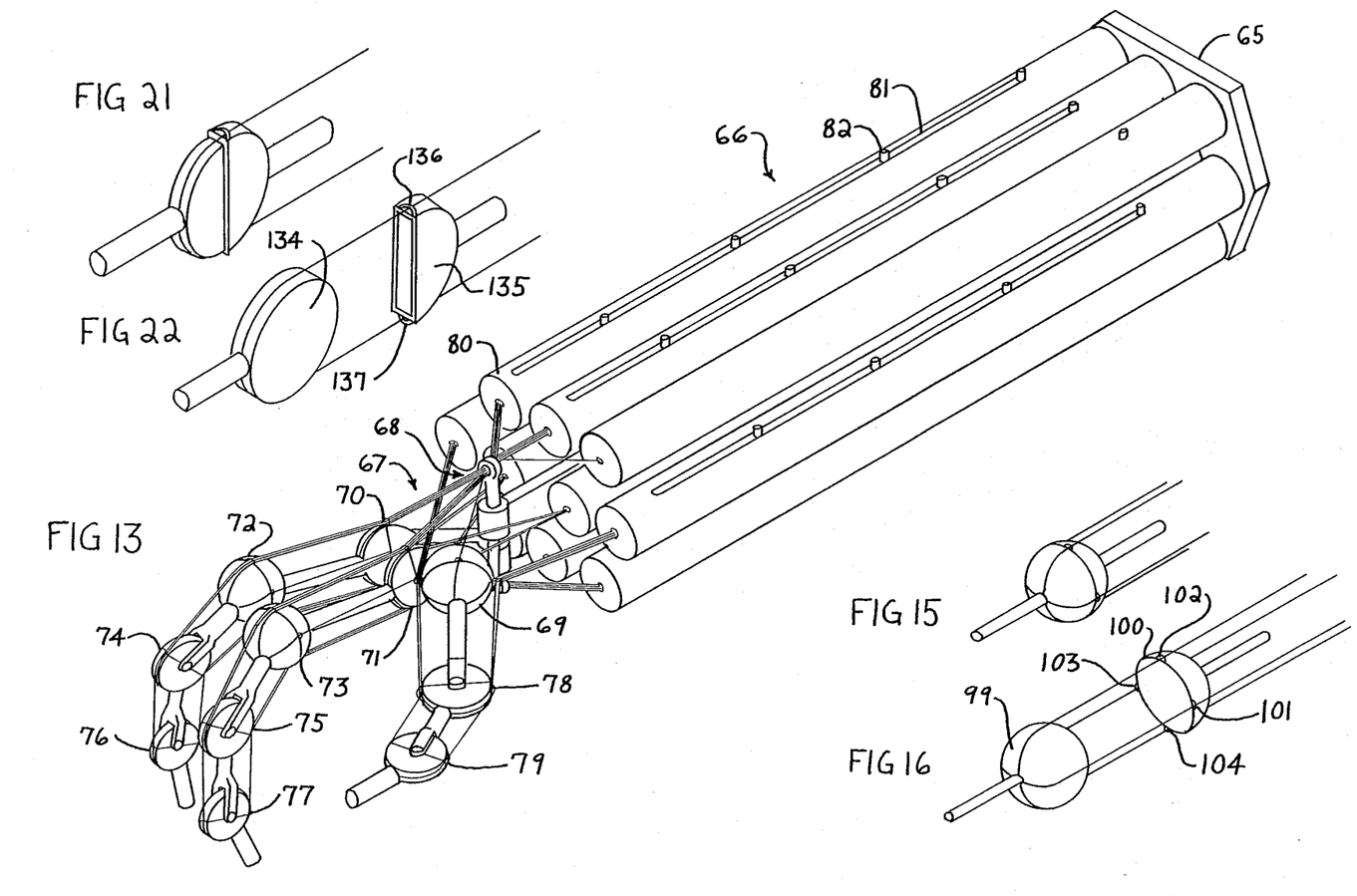
FIG. 13 is a view of a three-finger version of a robotic hand, including a wrist and thumb, using the drive system for each digit diagramed in FIG. 5 through FIG. 8.
FIG. 15 is a view of a ball-and-socket digit joint from FIG. 13.
FIG. 16 is an exploded view of the ball-and-socket joint from FIG. 15.
FIG. 21 is a view of a simple hinge-type joint from FIGS. 19 and 20.
FIG. 22 is an exploded view of the simple hinge-type joint in FIG. 21.

FIG. 13 shows a preferred embodiment of the robotic hand utilizing a thumb and two fingers. A frame 65 supports the drive units 66 and the wrist 67. Motion of the digits is achieved using the drive units described in FIGS. 5, 6, 7, and 8. To allow the back-forth motion of the wrist 67, without changing the length of tendons controlling up-down motion of the wrist and digits, the tendons that control up-down motion converge to a point 68 located on the centerline of the wrist's back-forth motion. These tendons then diverge from the point 68 and go to the correct digit. Joint 69 of the thumb digit is a ball-and-socket joint and has two directions of motion, back-and-forth and up-and-down. Joints 70 and 71 of the fingers are one-directional joints and only have up-down motion. Joints 72 and 73, the second joints of the fingers, have two directions of motion and are ball-and-socket. The remaining joints of the fingers, 74, 75, 76, and 77, are all joints with one-directional motion and have up-down motion. The two remaining joints on the thumb, 78 and 79, have one direction of motion, back-and-forth motion, unlike the finger joints 70, 71, 74, 75, 76, and 77, which are one-directional but have up-down motion. In the group of drive units 66, each line of drive cylinders is encased in hollow tubes 80. These tubes allow the cylinders to function properly without interfering with each other. Long slits or grooves in each tube shown on one tube at 81 allow the air or fluid inlets on each cylinder, one of which is pointed to at 82, to be exposed.

Figure 14:
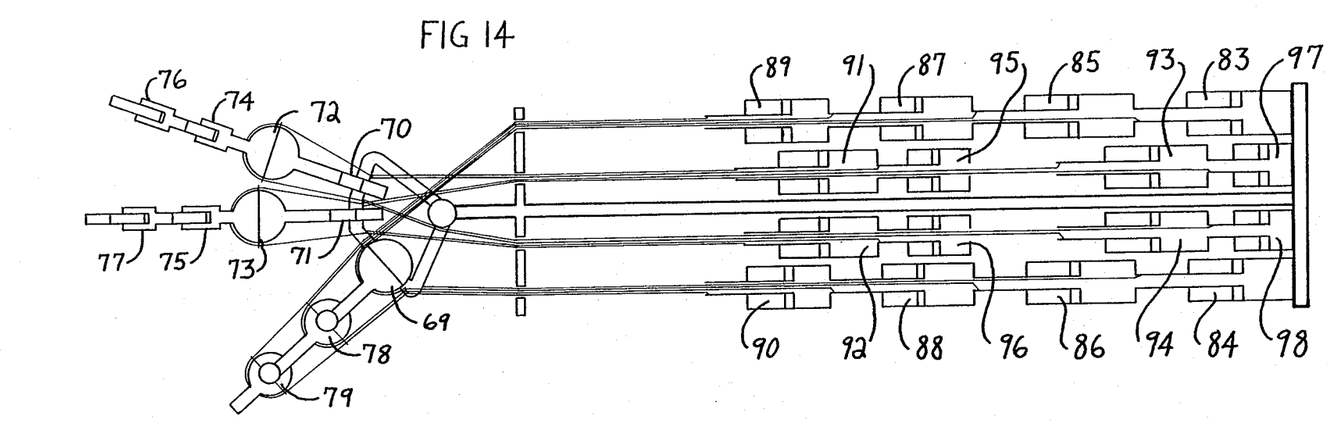
FIG. 14 is a schematic detail view in cross-section, through the center, from above, of the robotic hand in FIG. 13, showing the interconnection of tendons between individual digits and drive units that control back-forth motion of the digits.

FIG. 14 shows in cross-section, through the center, from above, the hand of FIG. 13. The interconnection of the tendons from cylinders to the joints that have back-forth motion is shown. Joint 69 is controlled by cylinders 85 and 86, joint 78 is controlled by cylinders 87 and 88, joint 79 is controlled by cylinders 89 and 90, joint 72 is controlled by cylinders 91 and 92, and joint 73 is controlled by cylinders 93 and 94. Cylinders 83, 84, 95, 96, 97, and 98 control the back-forth motion of the wrist and keep the tension in the tendons that run to joints 69, 72, 73 and 78 and 79 constant.

FIG. 15 shows the ball-and-socket joint from FIGS. 13 and 14. An exploded version in FIG. 16 is shown detailing the ball section 99 and the socket section 100. Cable guides at 101, 102, 103, and 104 hold the tendons in place.

FIG. 17 shows a cylinder as in FIGS. 10 and 11 with greater detail.

Figures 17A, 17B, 17C, 17D, 17E, 17F:
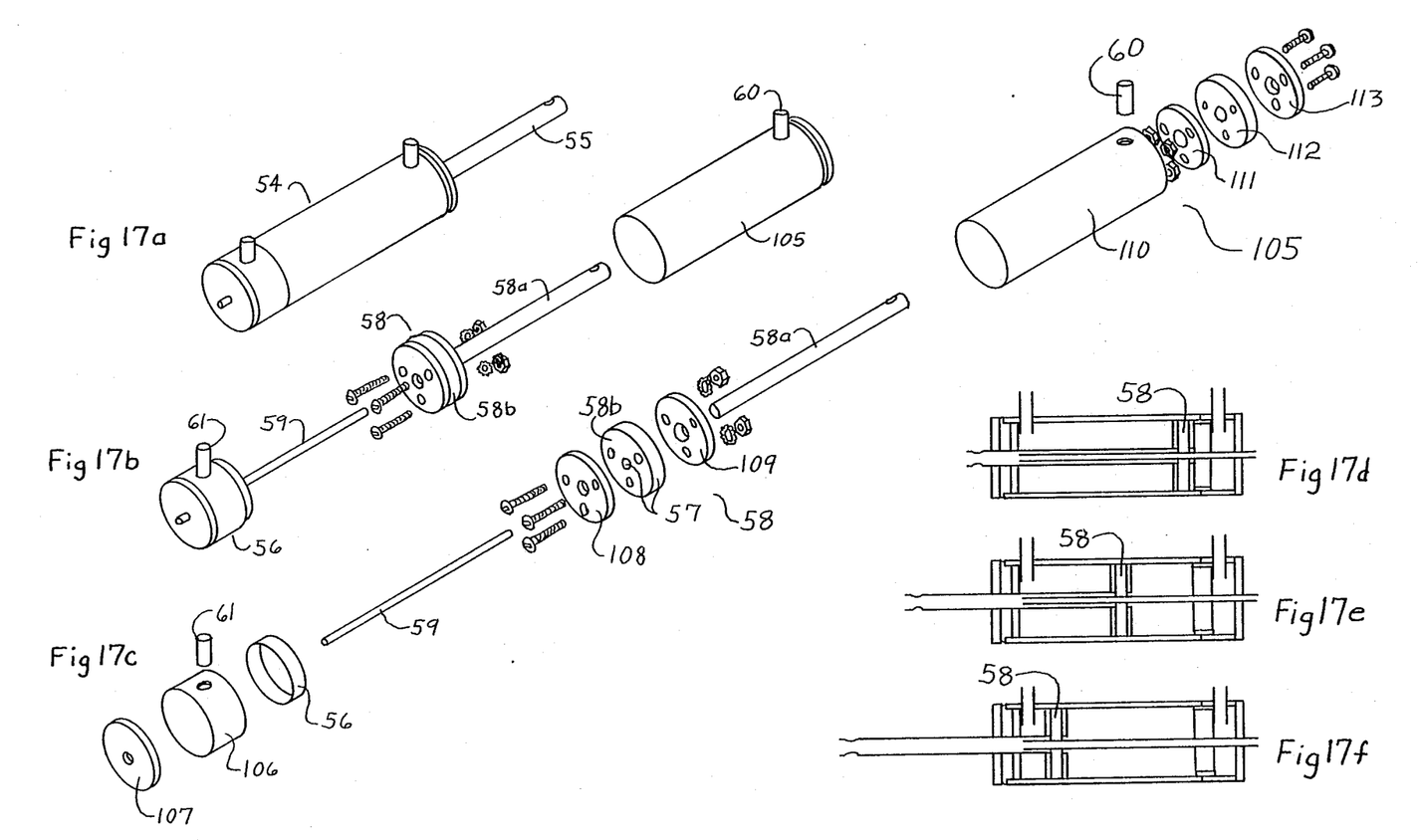
FIG. 17 contains detailed views of the cylinder from FIGS. 10 and 11.

The cylinder in FIG. 17a comes apart, as shown in FIG. 17b, into two pieces, 56 and 105, exposing the piston 58.

As shown in FIG. 17c the part 56 is constructed with the inlet 61, a short cylindrical piece with a hole for the inlet, (61), a connection piece 106, that helps hold and seal it to part 105, and an end cap 107, that fastens and seals to tube 59 and piece 106. The piston 58 is composed of a tube 58a, slightly larger than tube 59, fastened and sealed to plunger 108, the gasket 58b, and the cap 109 that fastens to the plunger 108 to compress the gasket when small bolts are tightened. The surfaces shown at 57 seal against the tubes 59 and 110. The end piece 105 is constructed with the inlet 60, a cylindrical piece 110 with a hole for the inlet, a cap 111, that attaches to part 110, a gasket 112 and an end cap 113, that fastens to the cap 111 to compress the gasket when small bolts are tightened. The gasket 112 seals against the tube 58a.

FIGS. 17d, 17e, and 17f are cross-section views showing the movement of the piston 58 inside the cylinder.

FIG. 18 shows another type of organization to provide many-jointed digit control using the double-acting cylinder from FIGS. 10, 11, and 17.

Figure 18A:
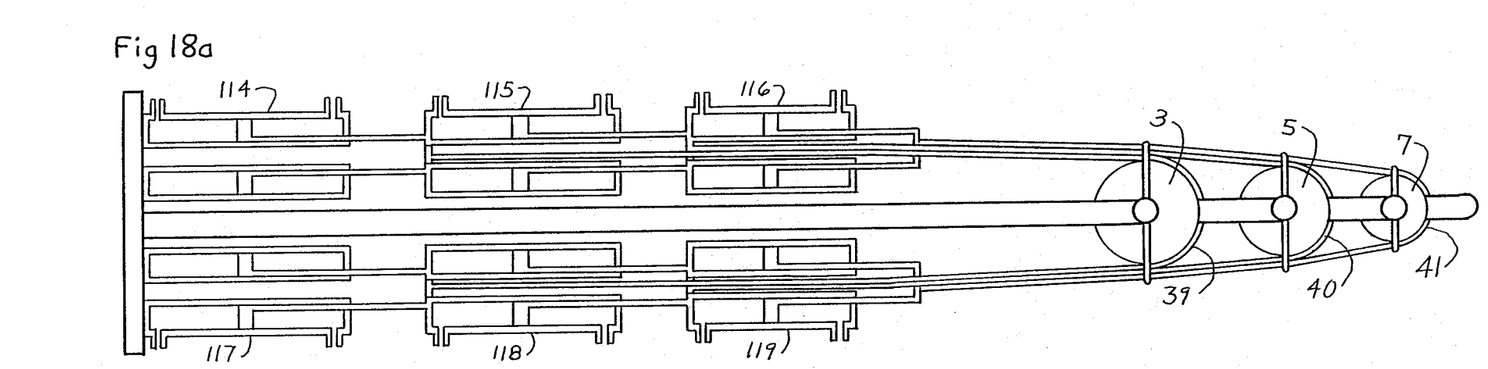
FIG. 18 includes four schematic views in cross-section a drive unit using cylinders as in FIGS. 10, 11, and 17, showing relative positions of the pistons corresponding movement of joints.

In FIG. 18a, all the piston are in the midpoint of the cylinders 114, 115, 116, 117, 118, and 119. The three joints 3, 5, and 7, are not bent.

Figure 18B:
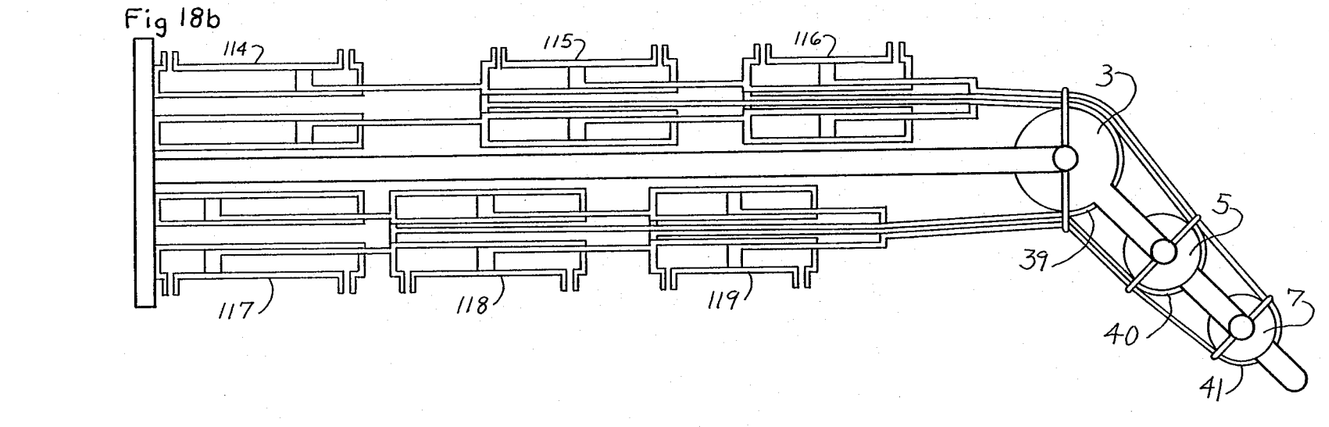

In FIG. 18b, joint 3 has bent when cylinders 114 and 117 moved.

Figures 18C, 18D:
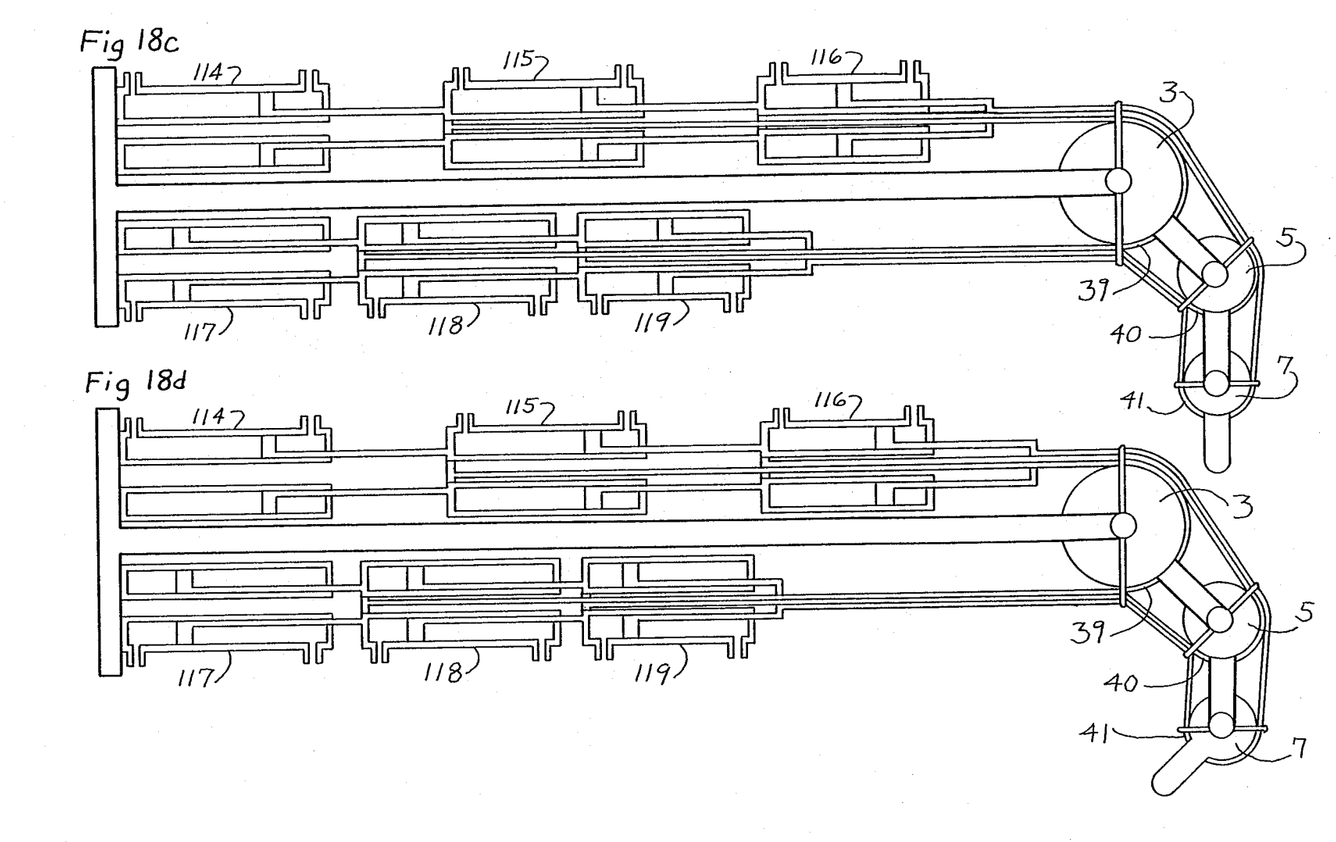

In FIG. 18c, joint 5 has bent when cylinders 115 and 118 moved.

In FIG. 18d, joint 7 has bent when cylinders 116 and 119 moved.

Figure 19:
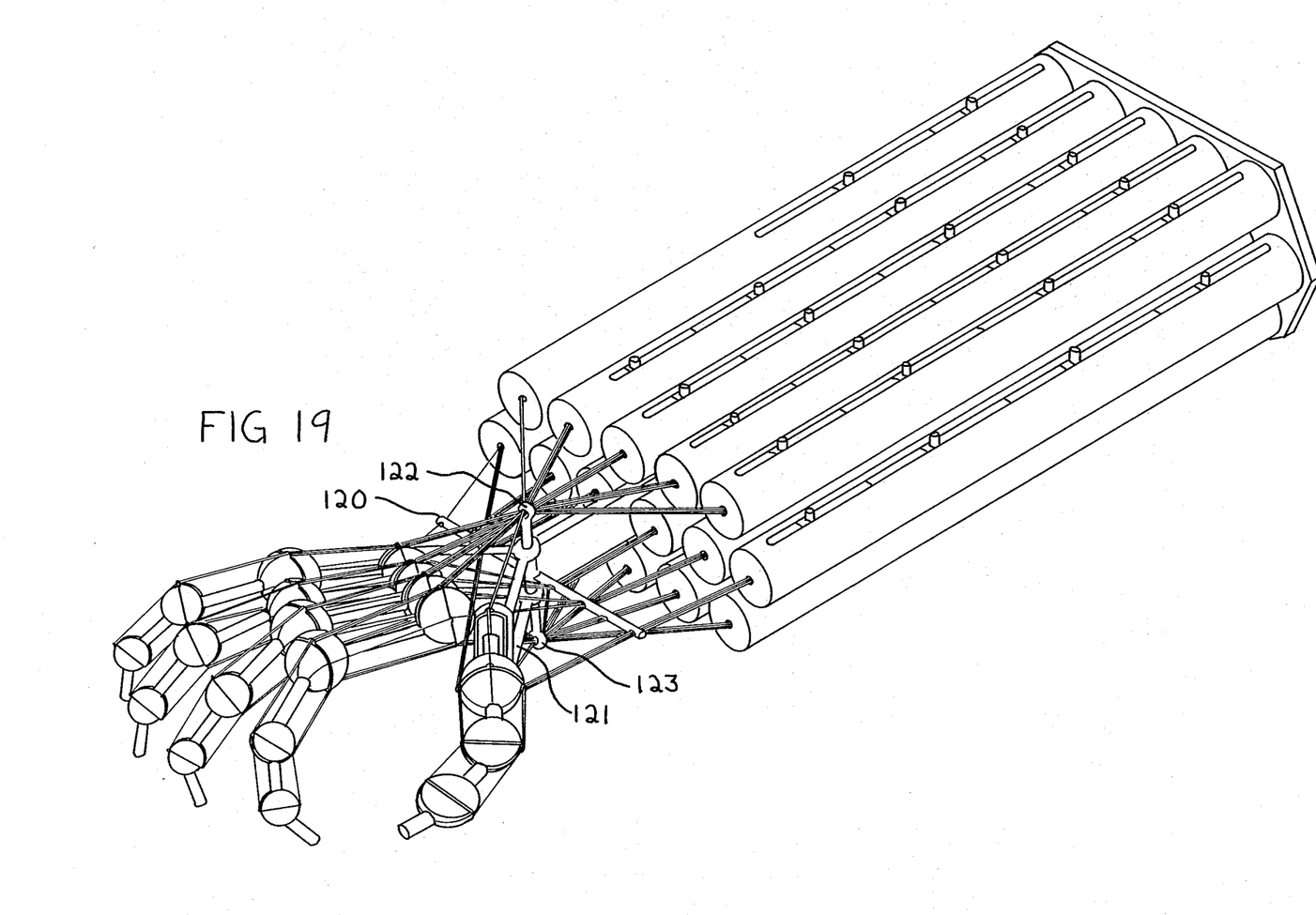
FIG. 19 is a view of a five-finger version of a robotic hand, including a wrist and thumb, using the drive system for each digit diagramed in FIG. 5.

FIG. 19 is a preferred embodiment of a robotic hand with five fingers and a wrist using the type of arrangement of cylinders as described in FIG. 5. This wrist includes a cable guide 120 to hold the cables controlling back-forth motion in line at the centerline of the wrist. The wrist bracket 121 pivots back and forth, connects to the first joint of each of the five digits and holds the two cable guides, shown at 122 and 123 for cables controlling the up-down motion of the digits.

Figure 20:
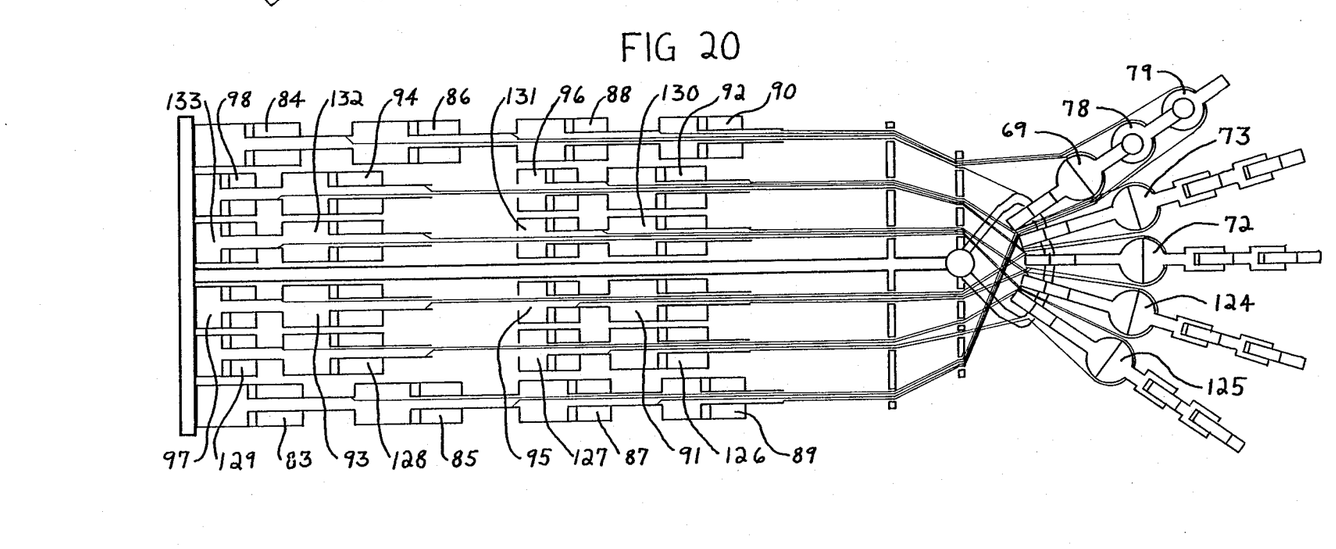
FIG. 20 is a schematic detail view in cross-section, through the center, from above, of the robotic hand in FIG. 19, showing the interconnection of tendons between individual digits and drive units that control back-forth motion of the digits.

FIG. 20 shows in cross-section, through the center, from above, the hand of FIG. 19. The interconnection of the tendons from cylinders to the joints that have back-forth motion is shown. The thumb and the first two digits are identical to the three finger version in FIG. 14. Joint 69 is controlled by cylinders 85 and 86, joint 78 is controlled by cylinders 87 and 88, joint 79 is controlled by cylinders 89 and 90, joint 72 is controlled by cylinders 91 and 92, and joint 73 is controlled by cylinders 93 and 94. Cylinders 83, 84, 95, 96, 97, and 98 control the back-forth motion of the wrist and keep the tension in the tendons that run to joints 69, 72, 73 and 78 and 79 constant. Joint 124 is controlled by cylinders 126 and 130 and joint 125 is controlled by cylinders 128 and 132. Cylinders 127, 129, 131, and 133 control the back-forth motion of the wrist and keep the tension in the tendons that run to joints 125 and 134 constant.

FIG. 21 shows the simple hinge joint from FIGS. 19 and 20. An exploded version in FIG. 22 is shown detailing the disk section 99 and the socket section 135. Cable guides at 136 and 137 hold the tendons in place.

What is claimed is:

1. An actuator cable drive apparatus comprising n actuator cables, a series of n coaxially oriented fluid-actuated cylinders, each of said n cylinders comprising a lubricated piston and an inlet through which pressurized fluid enters said cylinder causing said piston to be pushed back inside said cylinder, each said piston comprising seals to prevent fluid from escaping past said piston inside said cylinder, n narrow hollow connection rods and n wider hollow connection rods, each of said narrow rods attached at a first end to one end of one of said cylinders and each of said wider rods fitting outside a said narrow rod and attached at one end to one of said pistons, each of said wider rods protruding from the opposite end of said one of said cylinders and each of said wider rods except said nth wider rod attached at its other end to the next cylinder in said series, each of said n actuator cables except the nth actuator cable attached at one end to one of said narrow rods, said nth actuator cable being connected to said nth wider connecting rod, and said n actuator cables running freely through said hollow rods and cylinders, wherein movement of any of said pistons causes corresponding movement of its associated cable and the cables attached to the rods associated with the cylinders attached to said any of said piston.

2. An actuator cable drive apparatus comprising n actuator cables, a series of n coaxially oriented fluid-actuated cylinders, each of said n cylinders comprising a lubricated piston and an inlet through which pressurized fluid enters said cylinder causing said piston to be pushed back inside said cylinder, each said piston comprising seals to prevent fluid from escaping past said piston inside said cylinder, n hollow connecting rods, each of said hollow rods attached at one end to one of said pistons and having its other end protruding from a first end of the cylinder associated with said one of said pistons each of said hollow rods except said nth rod connected at its second end to a second end of the next cylinder in said series, each of said n actuator cables attached at one end to a different one of said hollow rods and running freely through said hollow rods and cylinders, wherein movement of any of said pistons causes corresponding movement of its associated actuator cable and the cables attached to the rods associated with the cylinders attached to said any of said pistons.

3. An actuator cable drive apparatus comprising n actuator cables, a series of n coaxially oriented double-acting fluid-actuated cylinders, each of said n cylinders comprising a lubricated piston, a first inlet on one side of said piston through which pressurized fluid enters or is released from said cylinder and a second inlet on the other side of said piston through which fluid is released or allowed to enter causing said piston to travel in either of two directions inside said cylinder, each said piston comprising seals to prevent fluid from escaping past said piston inside said cylinder, n narrow hollow connection rods and n wider hollow connection rods, each of said narrow rods attached at a first end to one end of one of said cylinders and each of said wider rods attached at one end to one of said pistons and each of said wider rods protruding from the opposite end of said one of said cylinders and fitting outside a said narrow rod and each of said wider rods except said nth wider rod attached at its other end to the next cylinder in said series, each of said n actuator cables attached on one end to a different one of said n wider connecting rods and running freely through said hollow rods and cylinders wherein travel of any of said pistons causes corresponding movement of its associated cable and the cables attached to the rods associated with the cylinders attached to said any of said pistons.

4. An apparatus as set forth in claim 1 for use in driving movable joints in a fully articulated artificial hand wherein each of said n actuator cables is attached to one of said movable joints and each of said cylinders corresponds to a direction of motion and degree of freedom of one of said joints.

5. An apparatus as set forth in claim 2 for use in driving movable joints in a fully articulated artificial hand wherein each of said n actuator cables is attached to one of said movable joints and each of said cylinders corresponds to a direction of motion and degree of freedom of one of said joints.

6. An apparatus as set forth in claim 3 for use in driving movable joints in a fully articulated artificial hand wherein each of said n actuator cables is attached to one of said movable joints and each of said cylinders corresponds to a direction of motion and degree of freedom of one of said joints.

7. An apparatus as set forth in claim 3 for use in driving movable joints in a fully articulated artificial hand wherein each of said n actuator cables is attached to one of said movable joints and each of said cylinders corresponds to a degree of freedom of one of said joints.

* * * * *